US008582041B2

(12) United States Patent
Tomizuka et al.

(10) Patent No.: US 8,582,041 B2
(45) Date of Patent: Nov. 12, 2013

(54) LIQUID CRYSTAL DISPLAY DEVICE HAVING A LENS ARRAY BEING ARRANGED THE EXTENDING DIRECTION OF THE LONGITUDINAL AXIS OF THE LENS

(75) Inventors: Yoshiteru Tomizuka, Mobara (JP); Kentaro Oku, Mobara (JP); Yoshinori Tanaka, Mobara (JP); Yoshiharu Nagae, Hitachi (JP)

(73) Assignees: Hitachi Displays, Ltd., Chiba-ken (JP); Panasonid Liquid Crystal Co., Ltd., Hyoho-ken (JP)

( * ) Notice: Subject to any disclaimer, the term of this patent is extended or adjusted under 35 U.S.C. 154(b) by 1286 days.

(21) Appl. No.: 11/861,330

(22) Filed: Sep. 26, 2007

(65) Prior Publication Data
US 2008/0180586 A1 Jul. 31, 2008

(30) Foreign Application Priority Data

Sep. 28, 2006 (JP) ................................. 2006-264262

(51) Int. Cl.
G02F 1/133 (2006.01)
G02F 1/1335 (2006.01)
G02B 5/30 (2006.01)
H04N 13/04 (2006.01)
G09G 5/00 (2006.01)

(52) U.S. Cl.
USPC ................. 349/15; 349/95; 349/96; 359/437; 359/462; 359/463; 348/51; 345/6

(58) Field of Classification Search
USPC .......... 349/74, 95, 15, 96; 359/437, 462–463; 348/51; 345/6
See application file for complete search history.

(56) References Cited

U.S. PATENT DOCUMENTS

| 2004/0150767 | A1* | 8/2004 | Kim ................................. 349/74 |
| 2005/0254113 | A1* | 11/2005 | Cirkel et al. ................... 359/259 |
| 2006/0221284 | A1* | 10/2006 | Yata et al. ...................... 349/119 |
| 2007/0177007 | A1* | 8/2007 | Lipton et al. ..................... 348/51 |

FOREIGN PATENT DOCUMENTS

| JP | 05-107663 | 4/1993 |
| JP | 09-304740 | 11/1997 |
| JP | 10-142572 | 5/1998 |
| JP | 2001-054144 | 2/2001 |
| JP | 3335998 | 8/2002 |
| JP | 2005-196034 | 7/2005 |
| WO | WO-99-05559 | * 2/1999 ........................ 27/22 |

* cited by examiner

Primary Examiner — Lauren Nguyen
(74) Attorney, Agent, or Firm — Antonelli, Terry, Stout & Kraus, LLP.

(57) ABSTRACT

Moirés due to interference between two liquid crystal display panels in a display device which achieves three-dimensional displaying by using two liquid crystal display panels is to be prevented. By disposing a lenticular lens array between an upper liquid crystal display panel and a lower liquid crystal display panel, moirés and image blurs are prevented. This configuration can prevent the luminance levels and contrast of images from dropping.

17 Claims, 19 Drawing Sheets

|      | P(μm) | H(μm) | F(μm) | R(μm) | T(mm) |
|------|-------|-------|-------|-------|-------|
| LA#1 | 76.5  | 8.0   | 6.8   | 80    | 0.6   |
| LA#3 | 84.0  | 10.0  | 6.6   | 80    | 0.6   |

FIG.8
| | MOIRE | IMAGE BLUR AR VALUE |
|---|---|---|
| LA#1 CCW45° | ◎ | 93.7% |
| LA#1 CW45° | ◎ | 88.5% |
| LA#3 CCW45° | ○ | 94.0% |
| LA#3 CW45° | ○ | 90.7% |
| DIFFUSION SHEET (HAZE 87.5 × DOUBLE-SHEET) | ○ | 90.2% |
 GOOD
 FAIR

FIG.10

| CHARACTERISTICS OF REAR PANEL ||||||||
|---|---|---|---|---|---|---|---|
| LENS SPECIFICATION | MEASUREMENT ITEM | MEASURED VALUES |||||
| LA#1 CCW45° | LA WHITE LUMINANCE (#1 CCW) | 77.5 | 111.2 | 100.6 | 127.9 | 110.0 |
| | LA BLACK LUMINANCE (#1 CCW) | 1.60 | 1.76 | 1.64 | 1.84 | 1.68 |
| | LA_CR (#1 CCW) | 48.6 | 63.4 | 61.5 | 69.7 | 65.6 |
| LA#1 CW45° | LA WHITE LUMINANCE (#1 CW) | 80.5 | 99.0 | 95.8 | 134.5 | 122.6 |
| | LA BLACK LUMINANCE (#1 CW) | 1.04 | 1.00 | 0.92 | 1.00 | 1.04 |
| | LA_CR (#1 CW) | 77.6 | 99.3 | 104.4 | 134.9 | 118.2 |
| LA#3 CCW45° | LA WHITE LUMINANCE (#3 CCW) | 80.8 | 105.9 | 103.9 | 128.8 | 118.6 |
| | LA BLACK LUMINANCE (#3 CCW) | 1.84 | 1.96 | 1.96 | 2.08 | 2.04 |
| | LA_CR (#3 CCW) | 44.0 | 54.2 | 53.1 | 62.1 | 58.3 |
| LA#3 CW45° | LA WHITE LUMINANCE (#3 CW) | 81.3 | 98.6 | 95.9 | 129.6 | 122.2 |
| | LA BLACK LUMINANCE (#3 CW) | 1.16 | 0.96 | 1.08 | 1.11 | 1.04 |
| | LA_CR (#3 CW) | 70.3 | 103.0 | 89.1 | 116.6 | 117.8 |
| DIFFUSION SHEET (HAZE 87.5 × DOUBLE-SHEET) | DIFFUSION SHEET WHITE LUMINANCE | 55.6 | 55.4 | 56.1 | 51.5 | 46.5 |
| | DIFFUSION SHEET BLACK LUMINANCE | 8.54 | 6.34 | 6.38 | 5.11 | 4.83 |
| | DIFFUSION SHEET_CR | 6.5 | 8.7 | 8.8 | 10.1 | 9.6 |

| BACKLIGHT CONFIGURATION |||||||
|---|---|---|---|---|---|---|
| UPPER DIFFUSION SHEET | D117VG | | | ○ | | ○ |
| UPPER PRISM | BEFIII90/50-T(V) | | | | ○ | ○ |
| LOWER PRISM | BEFIII90/50-T(H) | | ○ | ○ | ○ | ○ |
| LOWER DIFFUSION SHEET | D124 | ○ | ○ | ○ | ○ | ○ |

FIG.11

| CHARACTERISTICS OF FRONT PANEL ||||||||
|---|---|---|---|---|---|---|---|
| LENS SPECIFICATION | MEASUREMENT ITEM | MEASURED VALUES |||||
| LA#1 CCW45° | LA WHITE LUMINANCE (#1 CCW) | 82.7 | 116.1 | 105.9 | 134.1 | 122.2 |
| | LA BLACK LUMINANCE (#1 CCW) | 1.68 | 1.72 | 1.68 | 1.88 | 1.68 |
| | LA_CR (#1 CCW) | 49.4 | 67.7 | 63.2 | 71.5 | 73.0 |
| LA#1 CW45° | LA WHITE LUMINANCE (#1 CW) | 82.9 | 103.5 | 98.6 | 134.9 | 127.5 |
| | LA BLACK LUMINANCE (#1 CW) | 1.00 | 1.00 | 0.92 | 0.96 | 1.03 |
| | LA_CR (#1 CW) | 83.1 | 103.8 | 107.5 | 140.9 | 123.7 |
| LA#3 CCW45° | LA WHITE LUMINANCE (#3 CCW) | 85.0 | 100.4 | 108.4 | 134.9 | 124.7 |
| | LA BLACK LUMINANCE (#3 CCW) | 1.80 | 2.00 | 1.92 | 2.11 | 2.04 |
| | LA_CR (#3 CCW) | 47.4 | 50.3 | 56.6 | 63.8 | 61.3 |
| LA#3 CW45° | LA WHITE LUMINANCE (#3 CW) | 85.7 | 102.3 | 98.2 | 133.2 | 127.1 |
| | LA BLACK LUMINANCE (#3 CW) | 1.12 | 1.00 | 1.12 | 1.08 | 1.00 |
| | LA_CR (#3 CW) | 76.7 | 102.6 | 87.9 | 123.7 | 127.4 |
| DIFFUSION SHEET (HAZE 87.5× DOUBLE-SHEET) | DIFFUSION SHEET WHITE LUMINANCE | 57.6 | 60.9 | 61.0 | 57.5 | 51.0 |
| | DIFFUSION SHEET BLACK LUMINANCE | 8.5 | 6.30 | 6.34 | 5.23 | 4.83 |
| | DIFFUSION SHEET_CR | 6.78 | 9.7 | 9.6 | 11.0 | 10.6 |

| BACKLIGHT CONFIGURATION ||||||| 
|---|---|---|---|---|---|---|
| UPPER DIFFUSION SHEET | D117VG | | | | ○ | | ○ |
| UPPER PRISM | BEFⅢ90/50-T(V) | | | | | ○ | ○ |
| LOWER PRISM | BEFⅢ90/50-T(H) | | | ○ | ○ | ○ | ○ |
| LOWER DIFFUSION SHEET | D124 | | ○ | ○ | ○ | ○ | ○ |

A-A

A-A

A-A

A-A

B-B

LIQUID CRYSTAL DISPLAY DEVICE HAVING A LENS ARRAY BEING ARRANGED THE EXTENDING DIRECTION OF THE LONGITUDINAL AXIS OF THE LENS

CLAIM OF PRIORITY

The present application claims priority from Japanese Application JP 2006-264262 filed on Sep. 28, 2006, the content of which is hereby incorporated by reference into this application.

BACKGROUND OF THE INVENTION (1) Field of the Invention

The present invention related to display devices, and more particularly to a device which obtains three-dimensional images by using two liquid crystal panels.

(2) Description of the Related Art

One of the known methods of displaying a three-dimensional image is to arrange transmissive display panels with spacing between them, form similar images on the two transmissive display panels and control the luminance levels of the two images to create a sense of depth and thereby form a three-dimensional image. Technical literature disclosing such a method includes Japanese Patent Application Laid-Open Publication No. 2001-54144. A typical transmissive display device of this kind is a liquid crystal display panel.

In a liquid crystal display panel, many scanning lines and video signal lines are arranged crossing one another, and pixels are formed in areas surrounded by scanning lines and video signal lines. Therefore, a microscopic look at its screen would reveal regular occurrence of brighter parts and darker parts. When two liquid crystal display panels are arranged at a distance in mutually overlapping positions and images are formed, the brighter parts and the darker parts regularly formed on each liquid crystal display panel interfere with other to give rise to so-called moirés. Arrangement of a light diffusing layer between the two liquid crystal panels to address the problem of moiré occurrence in such a configuration is described in Japanese Patent No. 3335998.

By arranging a light diffusing layer between the two liquid crystal display panels as stated in Japanese Patent No. 3335998, moirés can be reduced, but there are such side effects as a drop in front luminance level, a decrease in contrast and blurring of images (fuzzy image contours).

An object of the present invention is to provide a display device in which three-dimensional images are obtained by arranging two liquid crystal display panels at a distance and controlling image signals of the two liquid crystal panels and which reduces moirés occurring as described above and prevents such side effects as a drop in front luminance level, a decrease in contrast and blurring of images.

SUMMARY OF THE INVENTION

In a system in which three-dimensional images are obtained by arranging two liquid crystal display panels at a distance and controlling image signals of the two liquid crystal panels, moirés and image blurring are suppressed by arranging a lens array whose light focusing action is more powerful in one specific direction than in a direction at a right angle to that specific direction. More specifically, this effect is achieved in the following manner.

(1) A display device which includes a first liquid crystal display panel, a second liquid crystal display panel disposed behind the first liquid crystal display panel with prescribed spacing in-between, and a backlight disposed behind the second liquid crystal display panel to enable the viewer to recognize an image from in front of the first liquid crystal display panel, wherein a lens array having a specific direction is disposed between the first liquid crystal display panel and the second liquid crystal display panel, and the lens array more powerfully focuses lights in a direction at a right angle to the specific direction.

(2) A version of the display device stated in (1), wherein the lens array does not focus lights in the specific direction.

(3) A version of the display device stated in (1), wherein the specific direction has angles to the external shapes of the first liquid crystal display panel and of the second liquid crystal display panel.

(4) A version of the display device stated in (3), wherein the angle is approximately 45 degrees.

(5) A version of the display device stated in (1), wherein the lens pitch of the lens array in the direction at a right angle to the specific direction is lower than the scanning line pitch of the first liquid crystal display panel or the second liquid crystal display panel.

(6) A version of the display device stated in (1), wherein the lens array is disposed tangentially to the second liquid crystal display panel.

(7) A version of the display device stated in (1), wherein the lens array includes lenticular lenses.

(8) A version of the display device stated in (7), wherein flat parts intervene between the lenticular lenses.

(9) A version of the display device stated in (1), wherein the lens section of the lens array is in a wave shape.

(10) A version of the display device stated in (1), wherein the lens section of the lens array is triangular.

(11) A version of the display device stated in (1), wherein the lens section of the lens array is triangular and the vertex angle of the triangle is greater than 90 degrees.

(12) A version of the display device stated in (1), wherein the lens section of the lens array is trapezoidal.

(13) A version of the display device stated in (1), wherein the lens section of the lens array is a pentagon whose vertex constitutes the tip of a lens.

(14) A version of the display device stated in (13), wherein the angular parts of the pentagon are substantially tangential to a circle having a prescribed radius.

(15) A version of the display device stated in (1), wherein the lens array is a microlens array including a large number of arrayed small convex lenses, and the pitch of the small convex lenses in the specific direction is lower than at a rectangle to the specific direction.

(16) A version of the display device stated in (1), wherein the backlight includes a diffusion sheet and a prism sheet which powerfully focuses the backlight in a prescribed direction.

(17) A version of the display device stated in (1), wherein the backlight includes a diffusion sheet, a prism sheet which powerfully focuses the backlight in a prescribed direction, and another prism sheet which powerfully focuses the backlight in a direction at a rectangle to the prescribed direction.

(18) A display device which includes a first liquid crystal display panel, a second liquid crystal display panel disposed behind the first liquid crystal display panel with prescribed spacing in-between, and a backlight disposed behind the second liquid crystal display panel to enable the viewer to recognize an image from in front of the first liquid crystal display panel, wherein a first polarizing board is stuck before the first liquid crystal display panel; a second polarizing board is stuck behind the second liquid crystal display panel; a lens array having a specific direction is disposed between the first liquid crystal display panel and the second liquid crystal display panel; and the lens array more powerfully focuses lights in a direction at a right angle to the specific direction.

(19) A version of the display device stated in (18), wherein the specific direction of the lens array is substantially identical with the polarizing axis of the first polarizing board or of the second polarizing board.

(20) A version of the display device stated in (18), wherein the lens array is a lenticular lens array, and the specific direction of the lenticular lenses is substantially identical with the polarizing axis of the first polarizing board or the second polarizing board.

(21) A display device which includes a first liquid crystal display panel, a second liquid crystal display panel disposed behind the first liquid crystal display panel with prescribed spacing in-between, and a backlight disposed behind the second liquid crystal display panel to enable the viewer to recognize an image from in front of the first liquid crystal display panel, wherein a first polarizing board is stuck before the first liquid crystal display panel; a third polarizing board is stuck behind the first liquid crystal display panel; a fourth polarizing board is stuck before the second polarizing board liquid crystal display panel; a second polarizing board is stuck behind the second polarizing board liquid crystal display panel; a lens array having a specific direction is disposed between the first liquid crystal display panel and the second liquid crystal display panel, and the lens array more powerfully focuses lights in a direction at a right angle to the specific direction.

(22) A version of the display device stated in (21), wherein the specific direction of the lens array is substantially identical with the polarizing axis of the first polarizing board or the second polarizing board.

(23) A version of the display device stated in (21), wherein the specific direction of the lens array is substantially identical with the polarizing axis of the third polarizing board or the fourth polarizing board.

Advantages of the present invention are stated below with respect to each of the devices stated above.

The device under (1) is enabled not only to restrain moiré and image blurring but also to prevent the luminance levels and contrast of images from dropping by using the lens array which more powerfully focuses lights in a direction at a right angle to the specific direction between the first liquid crystal display panel and the second liquid crystal display panel.

The device under (2) more distinctly manifests the advantages of the invention as it uses a lens array does not focus lights in the specific direction but does focus lights in a direction at a right angle to the specific direction.

The device under (3) or (4) is enabled to restrain moiré and image blurring and to prevent the luminance levels and contrast of images from dropping more effectively by arranging the specific direction of the lens array at an angle to the first liquid crystal display panel or the second liquid crystal display panel. This arrangement is most effective where the angle of inclination is 45 degrees.

The device under (5) enables the lens array to manifest its moiré reducing effect even more distinctly.

The device under (6) enables image blurring on the second liquid crystal display panel to be especially reduced and thereby to achieve an excellent three-dimensional image as a whole.

The devices under (7) and (8) enable the invention to be implemented with stable characteristics because the lens array they use is a lenticular lens array which is a typical lens array capable of focusing in a specific direction.

The device under (9) enables the interference of the lens array itself with other optical members or the like to be suppressed because a so-called wave sheet whose surface smoothly varies is used as the lens array.

The device under (10) enables the cost of members to be reduced because a prism sheet whose specification already in practical use in the backlight is available is used as the lens array.

The device under (11) can more distinctly manifest the main advantage of the invention, which is to suppress moiré and image blurring, because the vertex angle of each prism of the prism sheet is greater than 90 degrees.

The device under (12) enables the fabrication cost of molds for the manufacture of the lens array, and accordingly the cost of the lens array to be reduced because the section of each lens of the lens array is trapezoidal. Also, the trapezoidal section enables the characteristics of the lens array to approach those of usual lenticular lenses whose section is arciform. The trapezoidal section can further contribute to increasing the mechanical strength of the lens array.

The device under (13) facilitates the fabrication of the lens array and enables optical characteristics close to those of usual lenticular lenses to be achieved because the lens section of the lens array is a pentagon whose vertex constitutes the tip of a lens.

The device under (14) enables characteristics comparable to those of usual lenticular lenses to be achieved and the manufacturing cost of lens arrays can be reduced because the lens section of the lens array is a pentagon whose vertex constitutes the tip of a lens and the angular parts of the pentagon are substantially tangential to a specific circle.

The device under (15) allows the interference of the lens array itself with other optical members to be eased, depending on the configuration of the display device because the lens array is configured of a microlens array comprising a large number of arrayed small convex lenses.

The device under (16) is particularly conspicuous in the advantages of the invention, especially in enhancing the luminance levels and contrast because the backlight uses a prism sheet which powerfully focuses the backlight in a prescribed direction.

The device under (17) even excels over the device under (16) in enhancing the luminance levels and contrast because the backlight uses a prism sheet which powerfully focuses the backlight in a prescribed direction and another prism sheet which powerfully focuses the backlight in a direction at a rectangle to the prescribed direction.

The display device under (18) as a whole can enhance the efficiency of light utilization because it uses only two polarizing boards including one above the upper liquid crystal display panel and the other underneath the lower liquid crystal display panel. In addition, it is enabled not only to restrain moiré and image blurring but also to prevent the luminance levels and contrast of images from dropping by using the lens array between the first liquid crystal display panel and the second liquid crystal display panel. This configuration is more significant in enhancing brightness levels and contrast than where diffusion sheets are used.

The device under (19) can even more distinctly manifest the advantage of the invention because the specific direction of the lens array is made substantially identical with the polarizing axis of the polarizing board of either liquid crystal display panel.

The device under (20) can even more distinctly manifest the advantage of the invention because lenticular lenses are used as the lens array and the specific direction of the lenticular lenses is made substantially identical with the polarizing direction of the polarizing board of either liquid crystal display panel.

The device under (21) is a display device in which polarizing boards are stuck to the upper and lower sides of the upper liquid crystal display panel and to the upper and lower sides of the lower liquid crystal display panel to form an independent image on each of the upper liquid crystal display panel and the lower liquid crystal display panel to achieve three-dimensional displaying, and this configuration, too, can restrain moiré and image blurring but also to prevent the luminance levels and contrast of images from dropping. Such a configuration of display device using a lens array can also provide superior characteristics to those of the configuration using diffusion sheets.

The device under (22) can not only restrain moiré and image blurring but also prevent the luminance levels and contrast of images from dropping because the specific direction of the lens array is made substantially identical with the upper polarizing board of the upper liquid crystal display panel or the lower polarizing board of the lower liquid crystal display panel.

The device under (23) enables the backlight to be efficiently utilized by making the specific direction of the lens array substantially identical with the lower polarizing board of the upper liquid crystal display panel or the upper polarizing board of the lower liquid crystal display panel.

BRIEF DESCRIPTION OF THE DRAWINGS

These and other features, objects and advantages of the present invention will become more apparent from the following description when taken in conjunction with the accompanying drawings wherein:

FIG. 8 shows the results of evaluation of moirés and image blurs;

FIG. 10 shows the results of evaluation of the luminance level and contrast of the lower liquid crystal display panel;

FIG. 11 shows the results of evaluation of the luminance level and contrast of the upper liquid crystal display panel;

DETAILED DESCRIPTION OF THE PREFERRED EMBODIMENTS

The present invention will be disclosed in detail below with reference to the following embodiments thereof.

Embodiment 1

Figure 1:
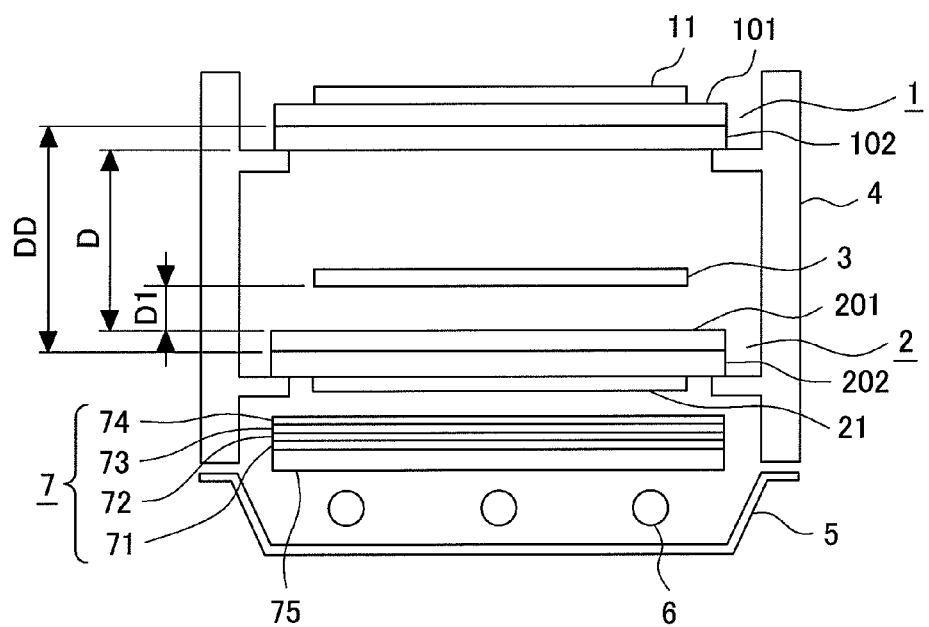
FIG. 1 shows a schematic section of Embodiment 1.

FIG. 1 shows a schematic section of a three-dimensional image according to the invention. Referring to FIG. 1, image signals are supplied to an upper liquid crystal display panel 1 and a lower liquid crystal display panel 2 to form images. Whereas related images are formed on the upper liquid crystal display panel 1 and the lower liquid crystal display panel 2, the two-dimensional image on each panel is enabled to look like a simulated three-dimensional image to human eyes by adding information on the depthwise direction to each image. More specifically, a sense of depth is created by differentiating the luminance levels of the image formed on the upper liquid crystal display panel 1 and of the image formed on the lower liquid crystal display panel 2.

Figure 5:
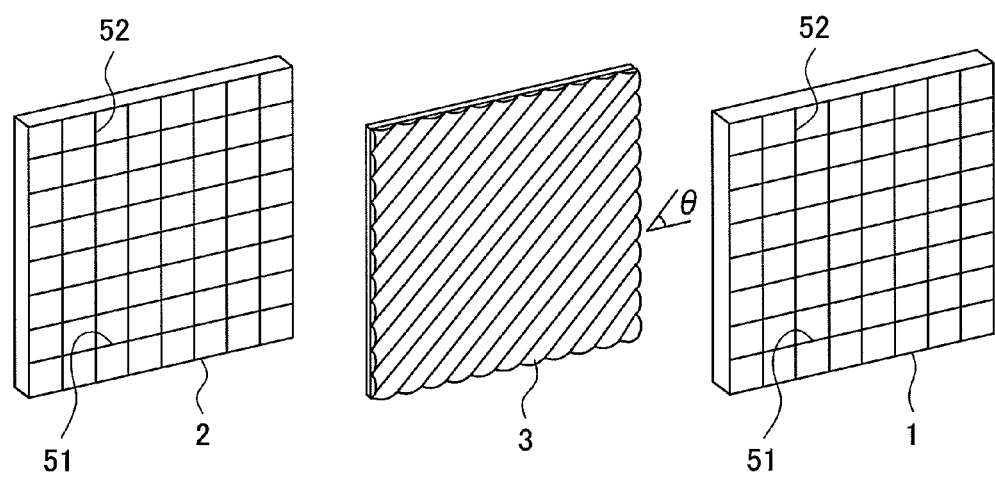
FIG. 5 shows the arrangement of liquid crystal display panels and lenticular lenses.

The effective screen of each liquid crystal display panel in this embodiment measures 9 inches diagonally. The upper liquid crystal display panel 1 includes an upper substrate 101 and a lower substrate 102, usually formed of glass, and liquid crystals held between the lower substrate 102 and the upper substrate 101. Many scanning lines 51 and many video signal lines 52 extending in a direction at a right angle to the scanning lines 51 are formed in the lower substrate 102 as shown in FIG. 5 to form pixels surrounded by the scanning lines 51 and the video signal lines 52. Image signals fed to the pixel part varies the transmissivities of liquid crystals to form an image.

Figure 6:
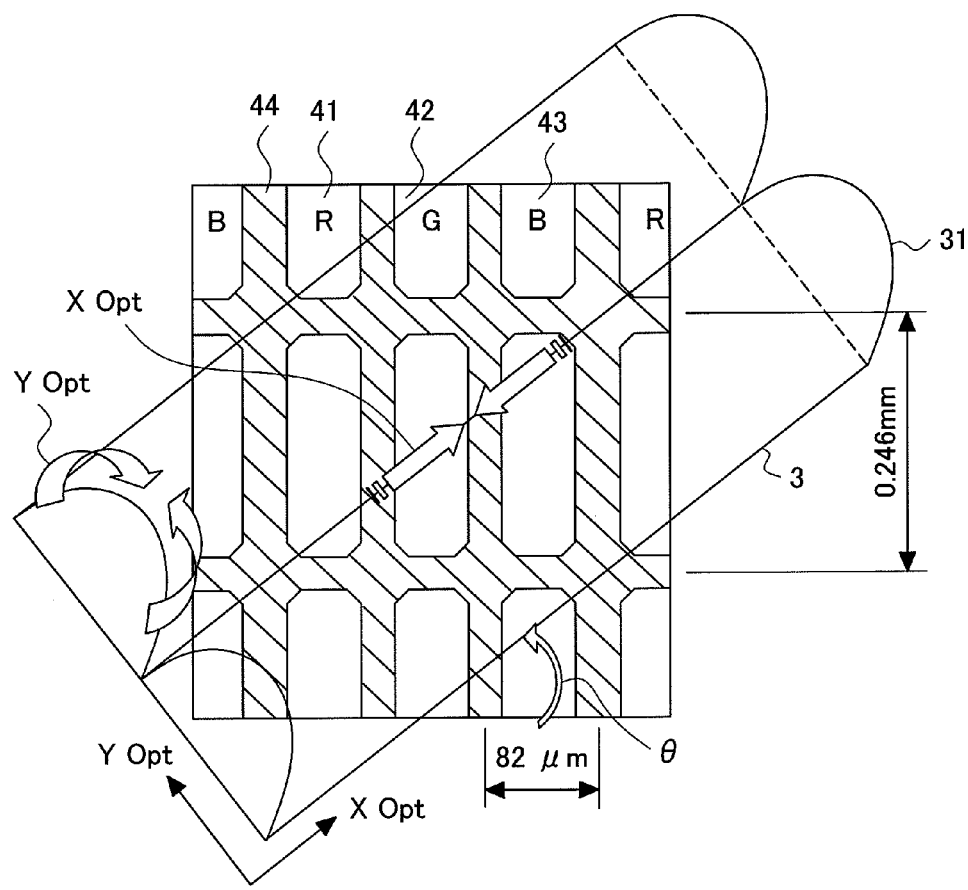
FIG. 6 shows a plan of the relationship between color filter surfaces and lenticular lenses.

Color filters of three colors including red, green and blue are formed in the upper substrate 101, matching the pixel part formed in the lower substrate 102, as shown in FIG. 6 to create a color image. Between the color filters, there is formed a black matrix 44 for enhancing the contrast. This black matrix 44 is formed covering the scanning lines 51 and the video signal lines 52 formed in the lower substrate 102. The configuration of the lower liquid crystal display panel 2, also including a lower substrate 202, an upper substrate 201 and liquid crystals held between them, is basically the same as that of the upper liquid crystal display panel 1.

Whereas liquid crystals can be caused to form an image by modulating light rays from the backlight, the light rays to be modulated by these liquid crystals need to be polarized in advance. For this purpose, a lower polarizing board 21 is disposed underneath the lower liquid crystal display panel 2 to have the light rays from the backlight modulated. Light rays emitted from the lower liquid crystal display panel 2 come incident on the upper liquid crystal display panel 1 through a lens array 3 to be described afterwards, and are modulated by the upper liquid crystal display panel 1. An upper polarizing board 11 is disposed to pick out such light rays as have been modulated by the lower liquid crystal display panel 2 and the upper liquid crystal display panel 1 to form an image. The upper liquid crystal display panel 1, the lower liquid crystal display panel 2, the lens array 3 and members appended thereto are accommodated in a side frame 4. Where the liquid crystal display screen measures 9 inches in size, the distance DD between the liquid crystal layers of the two liquid crystal display panels is 7.5 mm, for instance. As the substrate of each liquid crystal display panel is 0.6 mm thick, the distance D between the upper liquid crystal display panel 1 and the lower liquid crystal display panel 2 is 6.3 mm. The lens array 3 is 0.6 mm thick. In the way it is illustrated in FIG. 1, the lens array 3 is supposed to be apart from the lower liquid crystal display panel 2 by a distance D1, but it may be positioned anywhere between the upper liquid crystal display panel 1 and the lower liquid crystal display panel 2 as required. The image on the liquid crystal display panel closer to the lens array 3 is subject to a greater influence from the lens array 3.

Since the liquid crystal display panels emit no light for themselves, a backlight is required. Referring to FIG. 1, fluorescent tubes 6 are arranged as the light source in a lower frame 5. In this system, two liquid crystal display panels are used. The light transmissivity of each liquid crystal display panel is 10% or less. Therefore, the light transmissivity of the two liquid crystal display panels together is 1% or less. The backlight of this system accordingly requires a high luminance level. Although the configuration shown in FIG. 1 has three fluorescent tubes 6 as the light source, in some cases even a screen or 9 inches or so may need about nine fluorescent tubes 6 in order to ensure a high enough luminance level.

The inside of the lower frame 5 is a light reflecting surface. In order to collect as much the light as possible on the main surface side of the liquid crystal panels, an optical sheet group 7 is formed over the fluorescent tubes 6 which constitute the light source. Referring to FIG. 1, the optical sheet group 7 is formed of a lower diffusion sheet 71, a lower prism sheet 72, an upper prism sheet 73 and an upper diffusion sheet 74. Not all these sheets in the optical sheet group 7 are always needed, but only required ones in consideration of the demanded luminance level, picture quality, cost and other factors of the screen are provided.

A diffusion board 75 is disposed underneath the optical sheet group 7. The roles of the diffusion board 75 are to diffuse and uniformize the light rays from the fluorescent tubes 6 serving as the light source and to support the optical sheet group 7. The diffusion board 75, formed of polycarbonate, is 2 mm in thickness and about 70% in transmissivity. As the diffusion board 75, for instance Takiron's product PCDSD471G is used.

Figure 2:
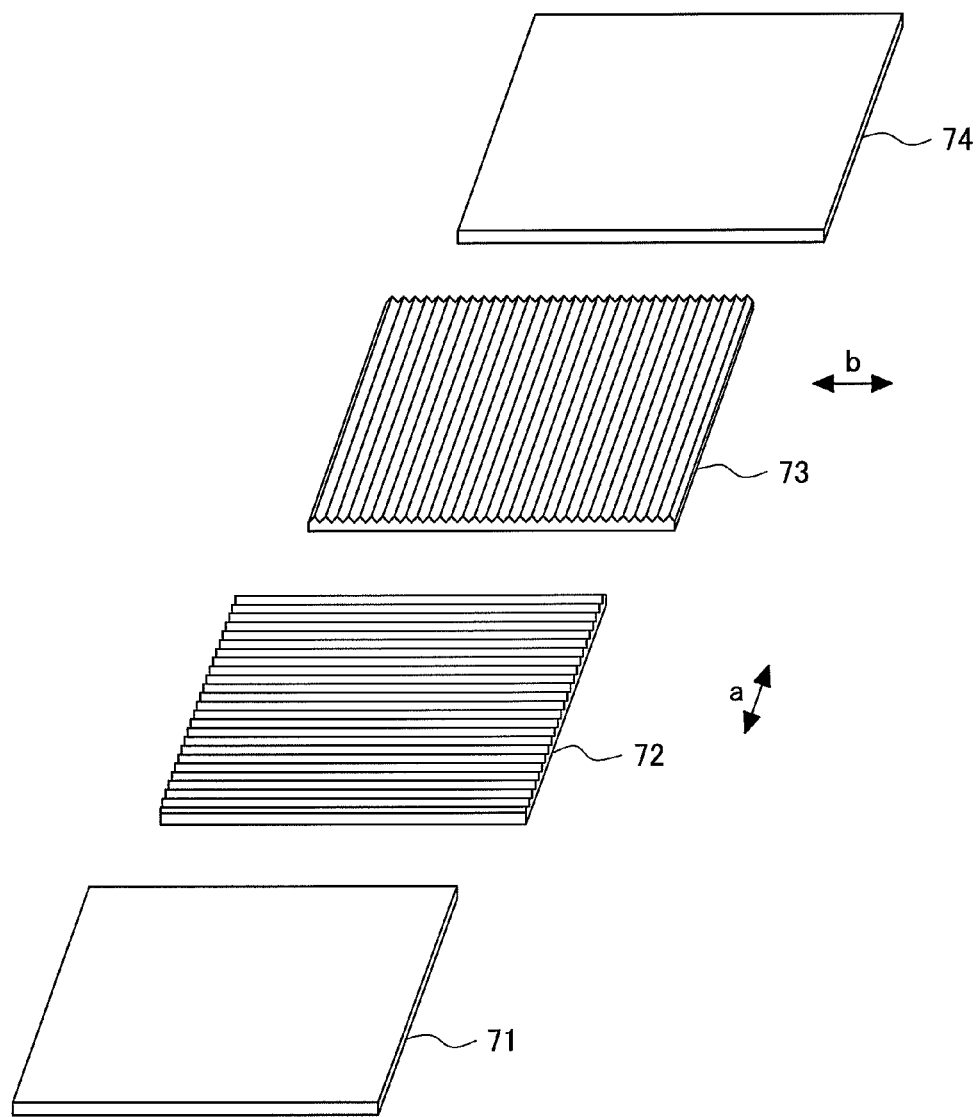
FIG. 2 shows a perspective view of optical sheets of a backlight.
Figure 3:
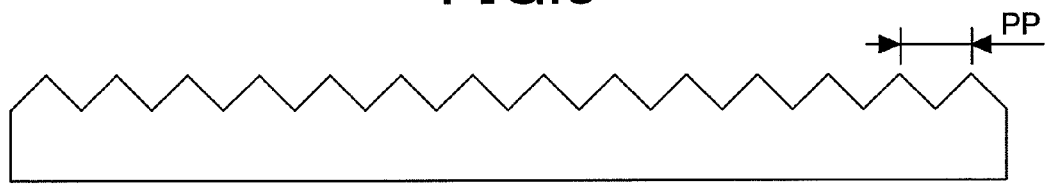
FIG. 3 is a section of a prism sheet.

An exploded perspective view of the optical sheet group 7 of FIG. 1 is shown in FIG. 2. As the light source is made up of the fluorescent tubes 6, the lower diffusion sheet 71 is disposed to prevent the light rays from the backlight from becoming uneven, only the positions of the fluorescent tubes 6 being made brighter than elsewhere. As the lower diffusion sheet 71, Tsujiden's product D124 is used. Over the lower diffusion sheet 71, the lower prism sheet 72 is disposed. Section A-A of the lower prism sheet 72 looks as shown in FIG. 3, wherein many small prisms are formed. The pitch of these prisms is 50 µm for instance. This lower prism sheet 72 performs the role of condensing light rays from the backlight, which otherwise would tend to expand in direction "a" shown in FIG. 2, toward the liquid crystal panels. As the lower prism sheet 72, 3M's product BEFIII90/50-T(H) is used for instance.

The upper prism sheet 73 is formed over the lower prism sheet 72. Section B-B of the upper prism sheet 73 looks as shown in FIG. 3, and its pitch, like that of the lower prism sheet 72, is 50 µm for instance. The upper prism sheet 73 performs the role of condensing light rays from the backlight, which otherwise would tend to expand in direction "b" shown in FIG. 2, toward the liquid crystal panels. As the upper prism sheet 73, 3M's product BEFIII90/50-T(V) is used for instance. The upper diffusion sheet 74 is formed over the upper prism sheet 73 to further uniformize the light rays coming out of the prism sheets. As the upper diffusion sheet 74, Tsujiden's product D117VG is used for instance.

Figure 4:
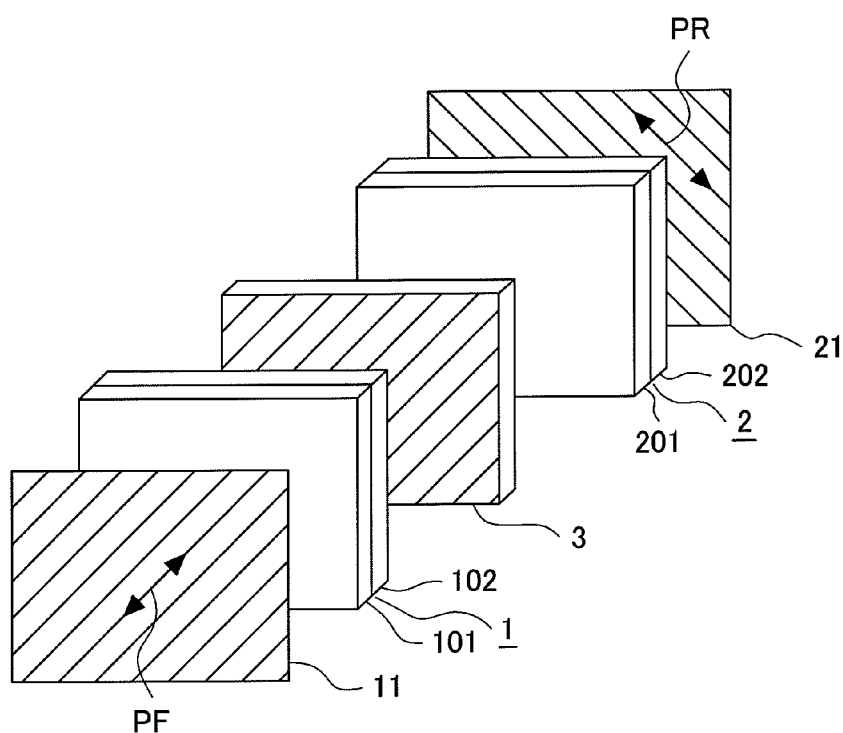
FIG. 4 shows an exploded perspective view of an image formation unit.

FIG. 4 shows an exploded perspective view of the essential part of this embodiment. Over the upper liquid crystal display panel 1, the upper polarizing board 11 is disposed and, underneath the lower liquid crystal display panel 2, the lower polarizing board 21 is. Between the upper liquid crystal display panel 1 and the lower liquid crystal display panel 2, the lens array 3 is arranged. As this lens array 3 is used a lenticular lens array or the like, which focuses light rays in one direction but not in a rectangular direction. For instance, a lenticular lens array or the like is used. However, the effects of the invention can be achieved not only where light rays are focused in one direction but not at all in a rectangular direction but also where the focusing action is stronger in one direction than in a rectangular direction.

In this embodiment, as shown in FIG. 4, the polarizing direction PF of the polarizing board disposed over the upper liquid crystal display panel 1 is 45 degrees in the clockwise direction. The polarizing direction PR of the polarizing board disposed underneath the lower liquid crystal display panel 2 is 45 degrees in the counterclockwise direction. Light rays from the backlight are polarized by the lower polarizing board 21 of the lower liquid crystal display panel 2, and the polarization plane of the polarized light rays are turned by the lower liquid crystal display panel 2 and the upper liquid crystal display panel 1, polarized by the upper polarizing board 11 of the upper liquid crystal display panel 1 and emitted. In this configuration, as the polarized light rays having passed the lower polarizing board 21 are turned 90 degrees by the lower liquid crystal display panel 2 and by another 90 degrees by the upper liquid crystal display panel 1, the screen is white in a state in which no image signal is applied to the liquid crystals, namely the mode of so-called normally white.

The configuration of FIG. 4 is shown in a further simplified manner in FIG. 5. In FIG. 5, for the sake of simplifying the description, only the scanning lines 51 and the video signal lines 52 are represented in the upper liquid crystal display panel 1 and the lower liquid crystal display panel 2. The lenticular lens array 3 is disposed between the upper liquid crystal display panel 1 and the lower liquid crystal display panel 2. In the absence of the lens array 3, moirés would be generated by interference of the scanning lines 51 between each other or of the video signal lines 52 between each other of the upper liquid crystal display panel 1 and the lower liquid crystal display panel 2. According to the invention, moirés are prevented by arranging the lenticular lens array 3 between the upper liquid crystal display panel 1 and the lower liquid crystal display panel 2.

Available means of preventing moirés include the use of a diffusion sheet or a diffusion sheet, such as the one used for the backlight, between the upper liquid crystal display panel 1 and the lower liquid crystal display panel 2, but this means invites diffusion of lights, invites a drop in front luminance level, a loss in contrast and so forth. The invention is intended to prevent moirés, a drop in front luminance level and a loss in contrast by appropriately arranging the lenticular lens array 3. The lenticular lens array 3 includes a large number of semi-cylindrical lenses 31 arrayed in a certain direction. The angle formed between this direction in which the lenses 31 extend and the scanning lines 51 or the video signal lines 52 of the liquid crystal display panels significantly influences the moirés, luminance level, contrast and other factors. Hereinafter, the impact of this angle will be evaluated as represented by an angle θ formed by the direction of the scanning lines 51 and the direction in which the lenticular lenses 31 extend as shown in FIG. 5.

FIG. 6 shows the relationship among color filters formed on the upper substrate of a liquid crystal display panel, a black matrix and the lenticular lens array 3. The color filters include red filters 41, green filters 42 and blue filters 43 arrayed laterally in this sequence. The pitch of filter arrangement is 82 μm and that of filters of the same color, 246 μm. On the other hand, the longitudinal pitch of the color filters is 246 μm. Therefore, in terms of the tricolor set of R, G and B, the longitudinal and the lateral pitches are equal. The longitudinal pitch of the color filters corresponds to the pitch of the scanning lines 51, and the lateral pitch of the color filters, to the pitch of the video signal lines 52.

In FIG. 6, for the sake of brevity of representation, only two lenticular lenses 31 in the lenticular lens array 3 are shown to illustrate their relationship with the color filters. The lenticular lenses 31 focus light rays in the Y Opt direction in FIG. 6, but in the X Opt direction. The angle between the direction in which the lenticular lenses 31 extend and the direction of the lateral array of the color filters is θ.

Figure 7:
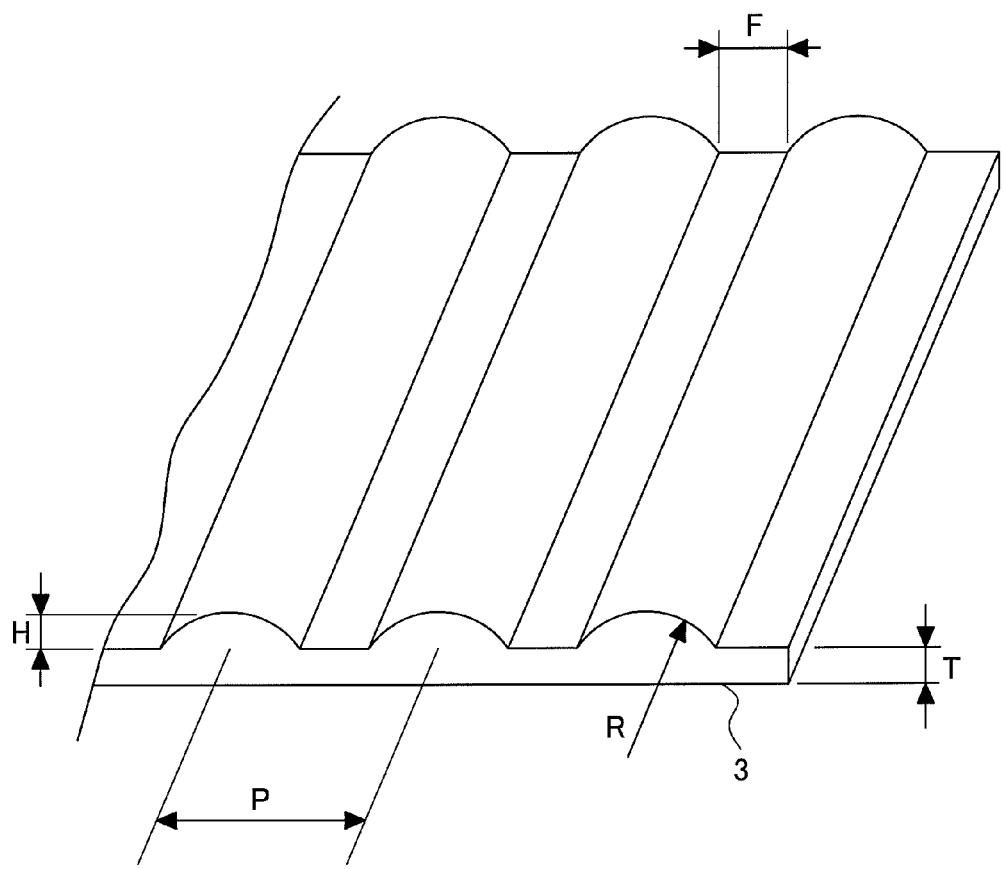
FIG. 7 shows a perspective view of lenticular lenses.

FIG. 7 shows a variation of the lenticular lenses 3. The example shown in FIG. 7 is a case in which flat parts F intervene between lenticular lenses 31. The effectiveness of the lenticular lens array 3 was evaluated by using the lenticular lens array 3 shown in FIG. 7 as an example. The varied parameters are the height H of the lenticular lenses 31 and the pitch P of the lenticular lenses 31. Supposing the radius of curvature R of the lenticular lenses 31 to be 80 μm, the widths of the flat parts F are necessarily determined. Incidentally, the lenticular lens array 3 is 0.6 mm thick. The material of the lenticular lens array 3 is an acryl resin (of 1.5 in refractive index). It is not absolutely necessary for the material of the lenticular lens array 3 to be acryl, but it may instead be glass (of 1.53 in refractive index) or the like. Other likely materials for the lenticular lenses include cellulose triacetate (TAC) and polycarbonate.

Two kinds of lenticular lens array 3 were evaluated as tabulated in FIG. 7. The plate thickness T of the lenticular lens arrays 3, the radius of curvature R of the lenticular lenses 31 and the flat parts between lenses were kept substantially constant, and the pitch P and the height H of the lenticular lenses were varied to assess the impacts of these variations. The two lenticular lens arrays were named LA#1 and LA#3 as shown in FIG. 7. LA#1 is 76.5 μm in lens pitch and 8 μm in lens height, while LA#3 is 84 μm in lens pitch and 10 μm in lens height. They are substantially the same in other aspects of configuration. The flat parts F measure 6.6 μm to 6.8 μm, the radius of curvature of the lenses is 80 μm and the lens arrays 3 are 0.6 mm thick.

To comparatively assess the effectiveness of the lenticular lens arrays 3, diffusion sheets were used in the same position instead of the lenticular lens array 3 as objects of comparison. The characteristics compared were the front luminance, contrast, moiré and blurring of image. In assessing each characteristic, the configuration of the optical sheet group for the backlight was also varied because the configuration of the backlight also would influence the results.

The direction θ of the lens array 3 has an impact on the evaluation of the effectiveness of the lenticular lens array 3. The best way to optimize this impact is to make the polarizing axis of the polarizing board 11 or 21 and the direction θ of the lens array 3 identical. The reason is that, whereas light is an electromagnetic wave, cancellation of light polarization is considered most unlikely to occur when the oscillating direction of the electric field (lateral wave) of the electromagnetic wave is identical with the direction θ of the lens array 3. The polarizing direction of the upper polarizing board 11 is 45 degrees in the clockwise direction, and that of the lower polarizing board 21, 45 degrees in the counterclockwise direction. Therefore, the direction of the lens array 3 was also evaluated with respect to 45 degrees in the clockwise direction and 45 degrees in the counterclockwise direction. The 45 degrees in this context includes 45 degrees±5 degrees, with the setting error and other factors taken into consideration.

The configuration of the backlight also influences each individual item of evaluation. Therefore, in part of the evaluation individual characteristics, the configuration of optical sheets was also varied. Thus, five different backlight specifications were assessed, including: a case of using only one diffusion sheet, one of using two diffusion sheets, one of using only one prism sheet and one of using two prism sheets. The same diffusion board 75 is used in all the backlight configurations compared because it is indispensable for uniformizing the lights of fluorescent tubes 6.

For comparison with lenticular lenses, diffusion sheets were used, because diffusion sheets are also effective against moirés and image blurring. A diffusion sheet, having a haze value of 87.5, consists of a transparent plastic film in which light diffusing particles are dispersed. Two diffusion sheets, one stacked over the other, are used to reduce moiré to an acceptable level for practical use. Comparative evaluation was accomplished by installing the lenticular lens array 3 or the diffusion sheets in the same position, immediately above the lower liquid crystal display panel 2. Positioning of the lens array 3 immediately above the lower liquid crystal display panel 2 served especially to reduce blurring of images on the lower liquid crystal display panel 2 with an overall result of excellent three-dimensional images as a whole.

As described so far, four different kinds of lens arrays according to the invention and diffusion sheets for comparison, totaling five kinds, were evaluated by using five different kinds of backlights. The items of evaluation comprised moiré, image blurring, white luminance level, black luminance level and contrast. The sequence of evaluation began with checking whether or not moiré is reduced to an acceptable level for practical use, followed by assessment of the image blurring level. After it was confirmed that moiré and image blurring had been reduced to respectively prescribed levels, each specification was checked for the white luminance level, black luminance level and contrast.

FIG. 8 shows the results of evaluation of moirés and image blurs. Moirés were evaluated by naked eye observation. In the moiré evaluation tabulated in FIG. 8, a double circle indicates the absence of any noticeable moiré and a single circle, the presence of a barely noticeable but only slight moiré, which would pose no practical problem. In FIG. 8, CCW represents a case in which the lenticular lenses are arranged at 45 degrees in the counterclockwise direction, and CW represents a case in which the lenticular lenses are arranged at 45 degrees in the clockwise direction. As is seen from FIG. 8, where lenticular lenses of LA#1 were used, the result was excellent with no noticeable moiré, and in the cases of other specifications as well, moirés were observed only at a low enough level to present no practical problem.

Figure 9A:
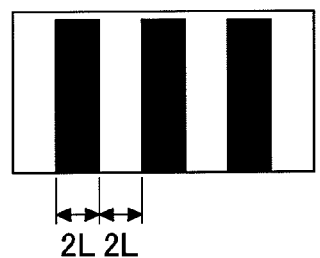
FIGS. 9A and 9B illustrate the definition of an image blur.

In FIG. 8, image blurs are evaluated in AR value terms. The definition of the AR value is defined in FIGS. 9A and 9B. The AR value represents the actual luminous energy level that is observed when data which periodically show white and black stripes of 2L in width as shown in FIG. 9A are entered as a signal. L here is the width of one set of red, green and blue. Since the width of red, green and blue is 0.082 mm each, L is 0.246 mm and 2L, 0.492 mm.

Figure 9B:
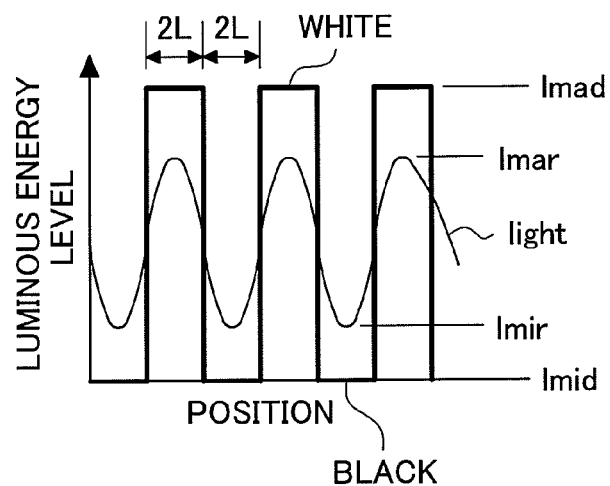

The actual definition of AR is illustrated in FIG. 9B. Referring to FIG. 9B, pulse-shaped signals "data" which periodically repeat signals "Imad" and signals "Imid" which spatially correspond to white and black, respectively, are inputted. The light outputs corresponding thereto on the screen form, for instance, the wave-shaped curve "light" shown in FIG. 9B, of which the maximum is "Imar" and the minimum, "Imir". In this case, AR is defined as AR=(Imar−Imir)/(Imad−Imid). The greater the AR value, the less the image blur.

Where image blurs are evaluated according to the pattern shown in FIGS. 9A and 9B, about 90% or above in AR value can be evaluated as representing absence of any image blur that would pose a practical problem. As shown in FIG. 8, every specification evaluated can be regarded as posing no problem in practical use.

After the evaluation of moiré and image blurring, the white luminance level, black and contrast were assessed. As this display device has two display panels including the upper liquid crystal display panel 1 and the lower liquid crystal display panel 2 as shown in FIG. 1, the characteristics of each panel were assessed.

FIG. 10 shows the results of evaluation of the lower liquid crystal display panel 2. Referring to FIG. 10, LA#1 and LA#3 are configured as illustrated in FIG. 7. In the table, CCW 45° refers to a case in which the lens array 3 is inclined 45 degrees counterclockwise, and CW 45°, to a case in which the lens array 3 is inclined 45 degrees clockwise. FIG. 10 compares five different specifications were assessed, including four specifications in which two kinds of lens array, LA#1 and LA#3, whose lens direction was varied between CW 45° and CCW 45°, plus one kind in which diffusion sheets were used. Since diffusion sheets have no directionality regarding the angle, obviously there was no need for comparison at varied angles. FIG. 10 shows the results of evaluation of the white luminance level, black luminance level and contrast (CR). Regarding the white luminance level, the higher the better and regarding the black luminance level, the lower the better. Regarding the contrast, which means the ratio of the white luminance level to the black luminance level, the higher the better.

FIG. 11 shows the results of evaluation of the upper liquid crystal display panel 1. The specifications, items and particulars of evaluation were the same as for the lower liquid crystal display panel 2 shown in FIG. 10.

The results of evaluation of the lower liquid crystal display panel 2 shown in FIG. 10 and those of the upper liquid crystal display panel 1 shown in FIG. 11 manifest substantially similar tendencies. As is seen from FIG. 10 and FIG. 11, comparison of the four specifications each using the lenticular lens array 3 and the one using diffusion sheets reveals distinguished superiority of the cases using the lenticular lens array 3 in all respects including the white luminance level, black luminance level and contrast. This is true of every specification of the backlight that has been evaluated.

The conceivable reason for the distinguished superiority in white luminance level, black luminance level and contrast manifested where the lenticular lens array 3 is used is that the lenticular lens array 3 does not vary the polarizing direction of the polarized light coming out of the lower liquid crystal display panel 2. On the other hand, where diffusion sheets are used, the polarizing direction of the polarized light coming out of the lower liquid crystal display panel 2 is varied by diffusion to result in the so-called cancellation of polarization. Moreover, since diffusion sheets diffuse lights, they essentially reduce the white luminance level, raise the black luminance level and reduce contrast.

Figure 12:
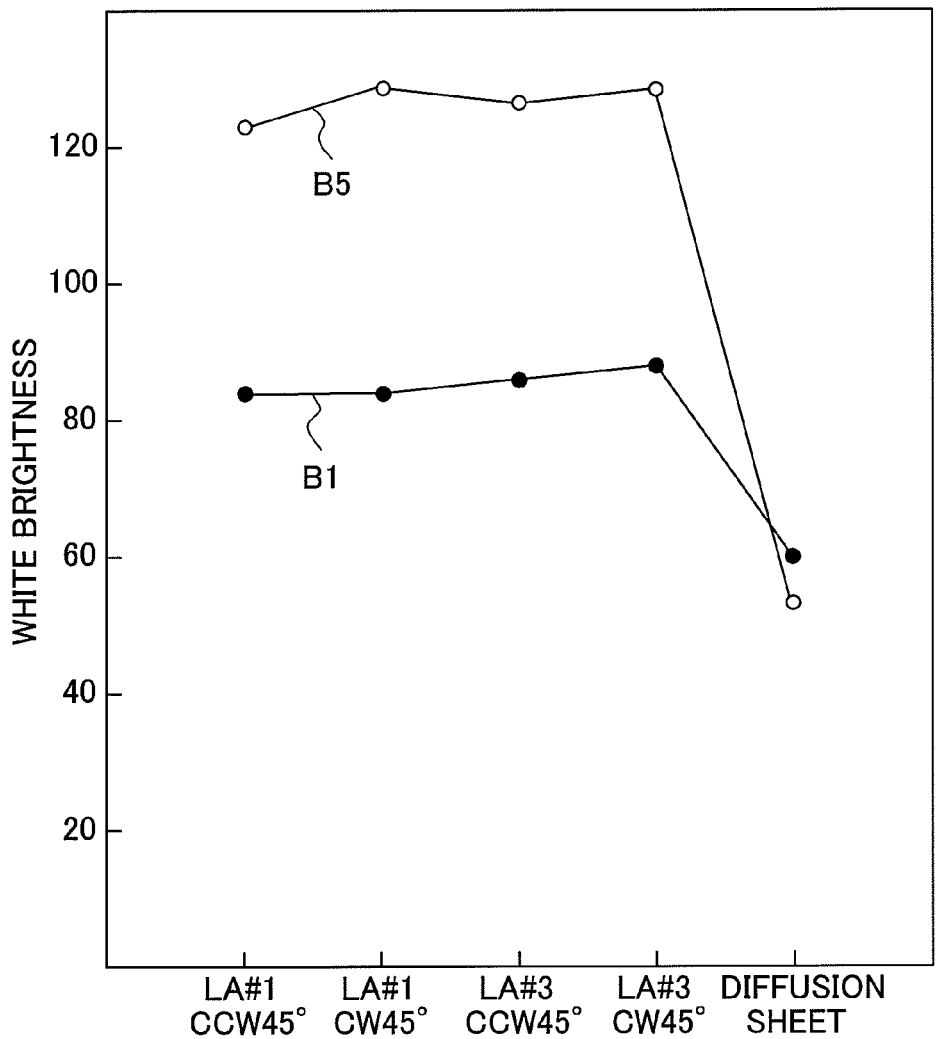
FIG. 12 shows the results of comparative evaluation of white luminance levels.
Figure 13:
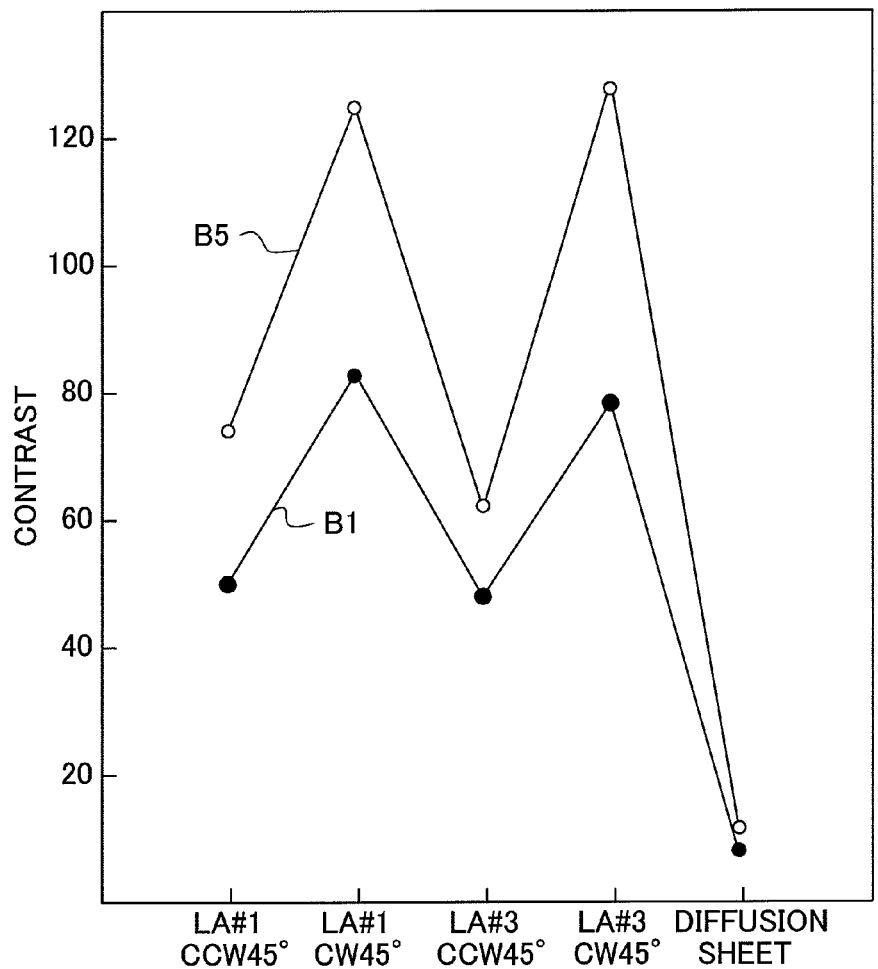
FIG. 13 shows the results of comparative evaluation of contrast.
Figure 14:
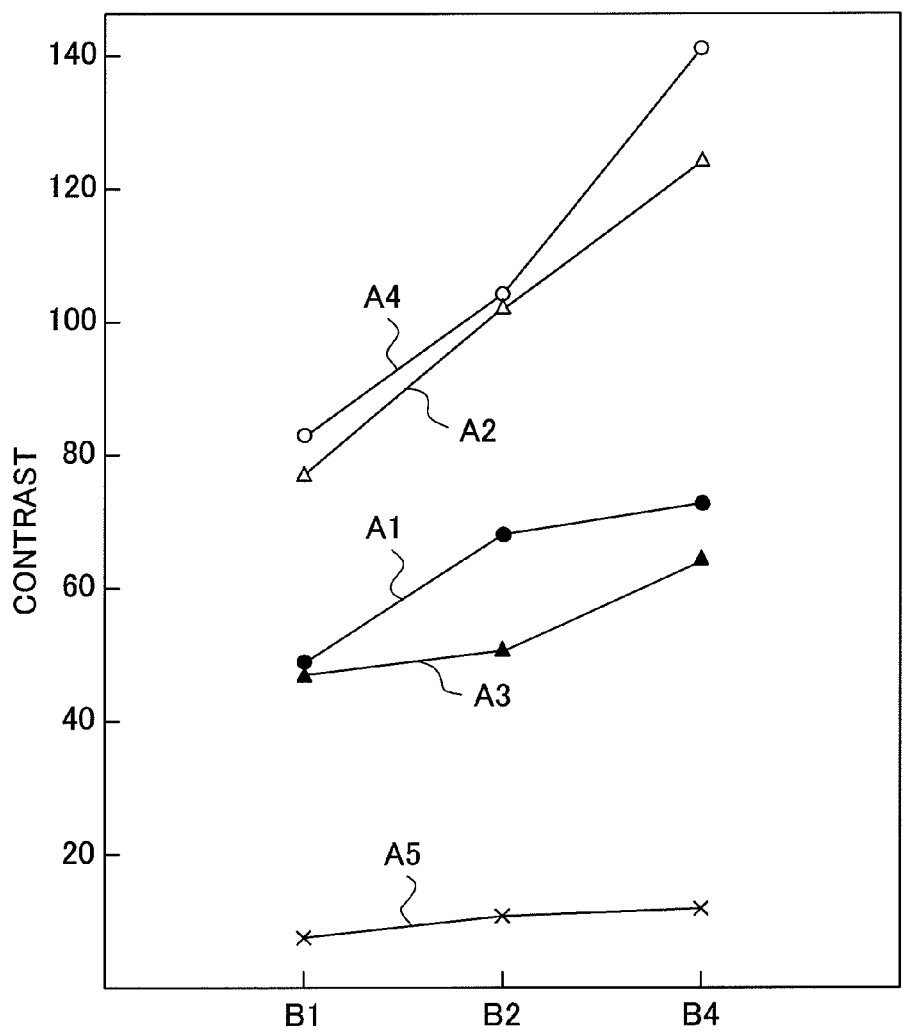
FIG. 14 shows the results of evaluation of the impacts of back light on contrast.

FIG. 12 through FIG. 14 illustrate in an easy-to-understand way how the white luminance level and contrast vary in individual specifications. The graphs presented as FIG. 12 through FIG. 14 illustrate the results of evaluation with respect to the upper liquid crystal display panel 1 because, as is seen from FIG. 10 and FIG. 11, the evaluation with respect to the upper liquid crystal display panel 1 and that with respect to the lower liquid crystal display panel 2 reveal substantially similar tendencies.

FIG. 12 shows how the white luminance level varies from one specification of lenses to another. In order to facilitate understanding of the illustration, only two backlight specifications are shown here including B1 (the lower diffusion sheet 71 alone is used) and B5 (the lower diffusion sheet 71, lower prism sheet 72, upper prism sheet 73 and upper diffusion sheet 74 are used). As is seen from FIG. 12, where the lenticular lens array 3 is used, the white luminance level of every specification is remarkably higher than where diffusion sheets are used. The difference is particularly significant between the case in which upper and lower diffusion sheets and upper and lower prism sheets are used as optical sheets for the backlight and that in which only a lower diffusion sheet is used. Thus, it can be assumed that the impact of the optical sheets of the backlight on the white luminance level is greater where the lenticular lens array 3 is used than where diffusion sheets are used.

FIG. 13 shows how contrast varies from one specification of lenses to another. In order to facilitate understanding of the illustration, only two backlight specifications are shown here including B1 (the lower diffusion sheet 71 alone is used) and B5 (the lower diffusion sheet 71, lower prism sheet 72, upper prism sheet 73 and upper diffusion sheet 74 are used) as in FIG. 12. As is seen from FIG. 13, the difference between the lenticular lens array 3 and the diffusion sheets is even greater with respect to contrast than with respect to the white luminance level.

The effectiveness of the lenticular lens array 3 can be considered extremely great regarding contrast. The conceivable reason for the high contrast is that, where the lenticular lens array 3 is used, the black is more depressed under the same conditions. Viewed the other way around, where diffusion sheets are used, the light diffusing effect seems to leave out the black and sacrifice the contrast. While no significant difference is observed among different specifications of the lenticular lens array regarding the white luminance level, the difference is noticeable retarding contrast. The contrast is sharper in the case of CW 45° than in the case of CCW 45°, namely because the black is more depressed in the case of CW 45°.

FIG. 14 illustrates the impacts of the backlight specification on different lens configurations. The characteristics to be assessed are represented here by contrast, which particularly influences picture quality. To assess the impacts of prism sheets in the backlight, three different backlight specifications including B1 (the lower diffusion sheet 71 alone is used), B2 (the lower diffusion sheet 71+the lower prism sheet 72) and B4 (the lower diffusion sheet 71+the lower prism sheet 72+the upper prism sheet 73), were compared. Although the addition of a prism sheet or sheets to the backlight serves to enhance contrast, the extent of that enhancement is greater when the lenticular lens array 3 is used than where diffusion sheets are used. Also among different specifications of the lenticular lens array, the contrast enhancing effect of addition of a prism sheet or sheets to the backlight is greater in the case of CW 45° than in the case of CCW 45°. Incidentally, no significant difference was observed between lenticular lens specification, namely between LA#1 and LA#3. Where the angle of the lens array 3 was CCW 45°, contrast was found higher with LA#1 than with LA#3. On the other hand, where the angle of the lens array 3 was CW 45°, LA#3 was found somewhat higher in contrast than LA#1.

Figure 15A:
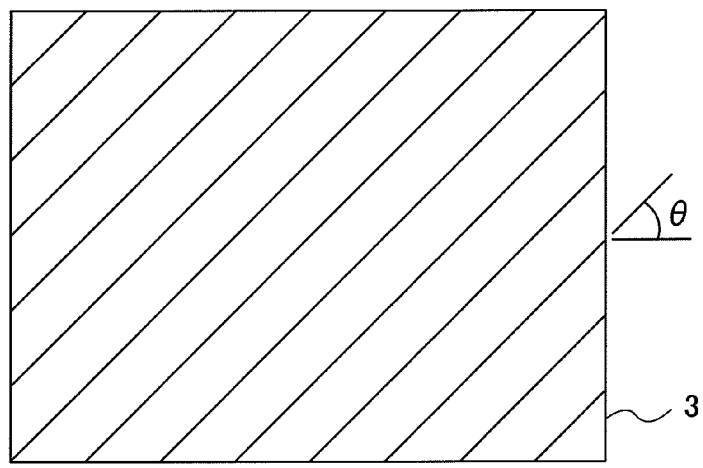
FIGS. 15A and 15B show another specification of lenticular lenses.
Figure 15B:

The evaluation described above was applied to lenticular lenses between which flat parts F were present as shown in FIG. 7. However, needless to mention in particular, lenticular lenses having no flat parts F between them as shown in FIGS. 15A and 15B can also be similarly effective.

Although moiré and image blurring can be reduced by arranging an optical member between the upper liquid crystal display panel 1 and the lower liquid crystal display panel 2 as described above, the brightness levels and contrast then could also pose a problem. The use of lenticular lenses as the optical members as in this embodiment of the invention can serve not only to reduce moiré and image blurring but also to restrain drops in brightness levels and contrast significantly more than where diffusion sheets are used.

Embodiment 2

The foregoing description of Embodiment 1 referred to usual lenticular lenses whose section is part of a circle. The application of the present invention, however, is not limited to usual lenticular lenses. Thus, the invention can be applied to any periodic array of lenses having a focusing action in one direction but in a direction at a rectangle to that one direction. It is also applicable to any periodic array of lenses whose lens action in one direction is greater than its lens action in a direction at a rectangle to that one direction.

Figure 16A:
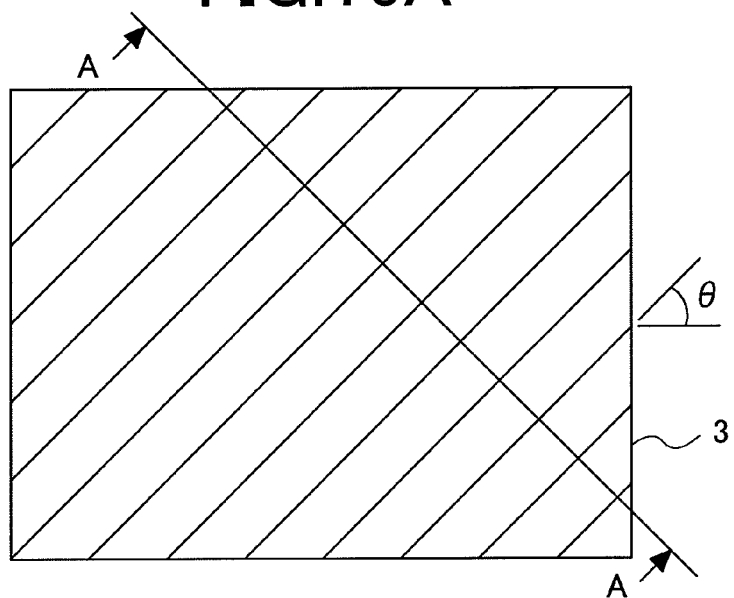
FIGS. 16A and 16B are conceptual diagrams of a wave sheet.
Figure 16B:
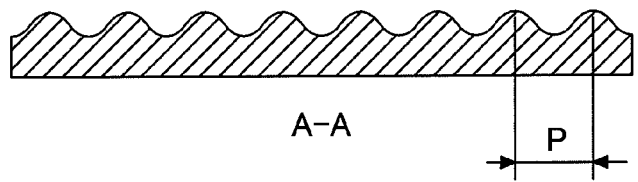

FIGS. 16A and 16B show another example of lens array 3, which is known as a wave sheet. FIG. 16A shows a plan of this lens array 3, wherein it is seen that each lens extends in the direction of an angle θ. FIG. 16B shows section A-A of FIG. 16A. This lens array 3 has a focusing action in the direction toward the vertexes of the wave but not in the direction in which the lenses extend, namely in the direction of θ in FIG. 16A. Lenses each having this thin and long focusing action are arrayed at a constant pitch. It is also possible to form such a lens array 3 at a pitch of about 50 µm. The lens array 3 shown in FIGS. 16A and 16B is also enabled to provide similar effects to those of Embodiment 1 by arranging it in such a position as is shown with respect to Embodiment 1. The advantage of this lens array 3 consists in that optical interference between the lens array 3 and other optical members can be prevented because the section of each lens of the lens array 3 varies smoothly in a wave shape.

Figure 17A:
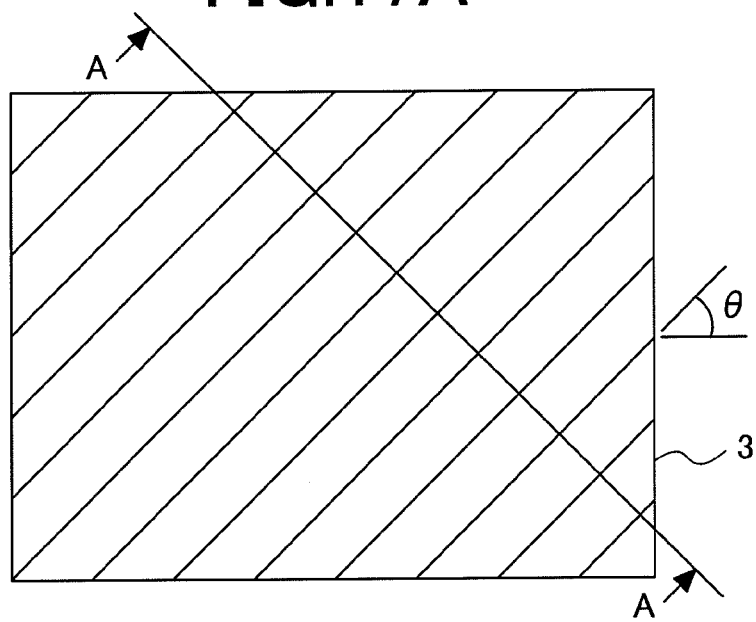
FIGS. 17A and 17B show another specification of a lens array.
Figure 17B:
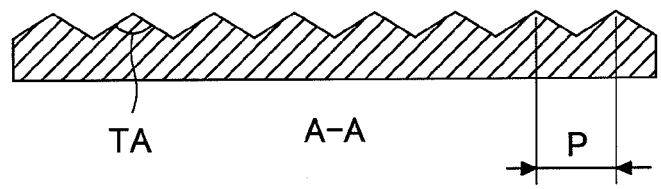

FIGS. 17A and 17B show another example of lens array 3, an example in which a similar prism sheet to what is used in the backlight is used as the lens array 3. FIG. 17A shows a plan of this lens array 3, wherein oblique lines represent the direction in which the lenses of the array extend. FIG. 17B shows section A-A of FIG. 17A. This lens array 3 has a focusing action in the direction toward the vertexes of the triangles in FIG. 17B but not in the direction in which the lenses extend, namely in the direction of θ in FIG. 17A. Lenses each having this thin and long focusing action are arrayed at a constant pitch. Such lens arrays 3 of about 50 µm in pitch are in practical use. Since the lens array 3 used here is not mainly intended for light condensation, it is more desirable for the vertex angle TA shown in FIG. 17B to be larger than 90 degrees. Also, by arranging the lens array 3 shown in FIGS. 17A and 17B in the position shown with respect to Embodiment 1, a similar effect to what is achieved by Embodiment 1 can be obtained.

Figure 18A:
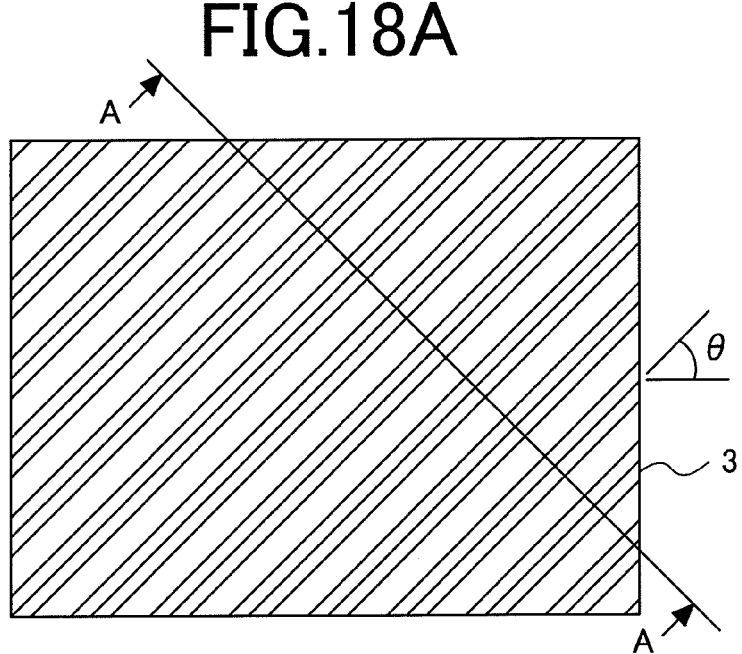
FIGS. 18A and 18B show still another specification of a lens array.
Figure 18B:
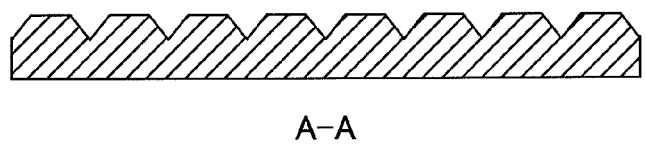

FIGS. 18A and 18B show still another example of lens array 3. In the lens array shown in FIGS. 18A and 18B, the sectional shape of each lens is trapezoidal as shown in FIG. 18B. This trapezoidal shape not only can reduce optical interference with other optical members than in the case of FIGS. 17A and 17B and others, but also enables optical characteristics close to those of conventional lenticular lenses whose section is arciform. The trapezoidal section can also contribute to increasing the mechanical strength of the lens array. The trapezoidal section further facilitates the fabrication of molds for the manufacture of the lens arrays and can thereby suppress their manufacturing cost.

Figure 19A:
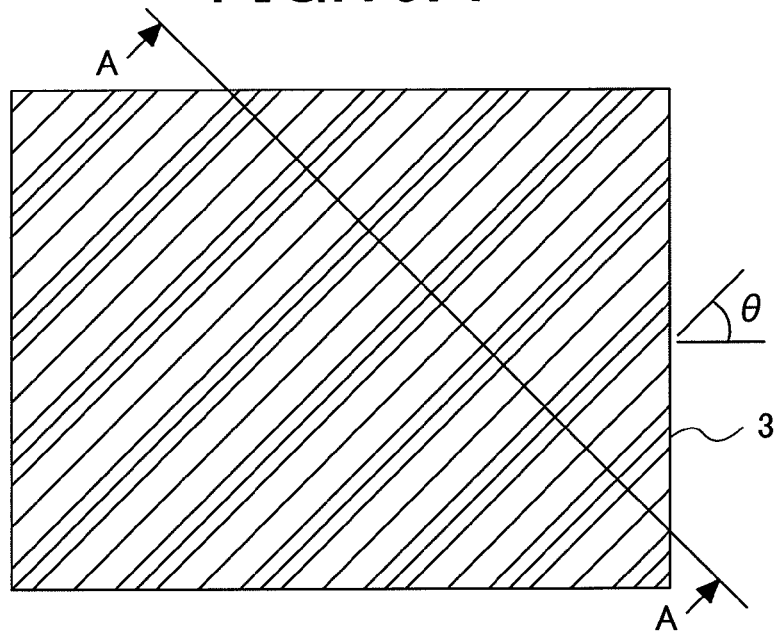
FIGS. 19A to 19C show still another specification of a lens array.
Figure 19B:
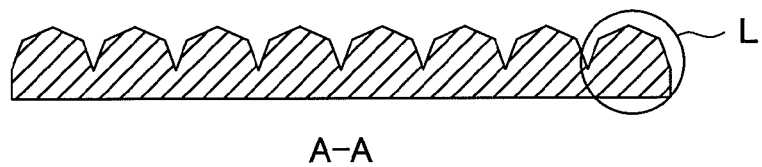
Figure 19C:
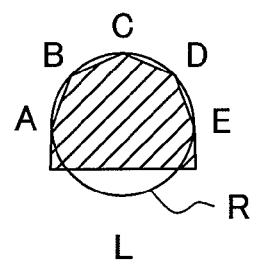

FIGS. 19A to 19C show still another example of lens array 3. In the lens array shown in FIGS. 19A to 19C, the sectional shape of each lens is pentagonal, with the tip of the lens being a vertex of the pentagon as shown in FIG. 19B. The usual way of lens array manufacturing begins with the fabrication of a mold, into which a resin or the like is poured. The mold is often fabricated by machining with a cutting tool. Fabricating the mold with a cutting tool is easier where the lens section is polygonal than where it is circular.

Usual lenticular lenses have an arciform section, but an arciform section is sometimes difficult to machine. By making the lens section pentagonal and inscribing the vertexes of the pentagon in a circle, the lenses can be provided with substantially similar characteristics to those of usual lenticular lenses as shown in FIG. 19C. The case illustrated in FIGS. 19A to 19C enables similar characteristics to those of usual lenticular lenses to be achieved while ensuring fabricating ease and restraining the manufacturing cost.

Figure 20A:
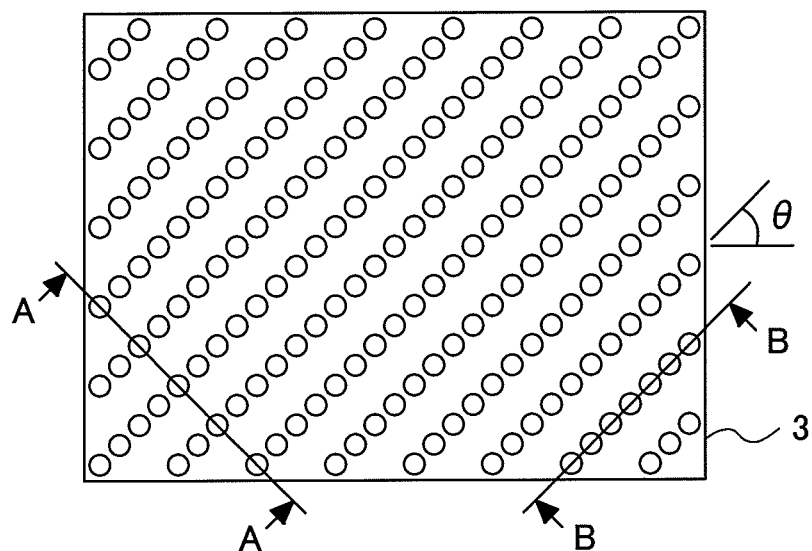
FIGS. 20A to 20C show still another specification of a lens array.
Figure 20B:
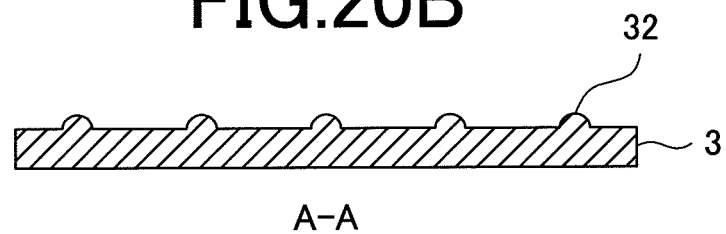
Figure 20C:
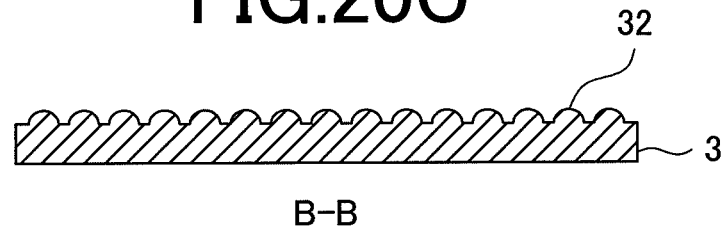

FIGS. 20A to 20C show still another example of lens array 3. The lens array 3 shown in FIGS. 20A to 20C is a microlens array comprising a large number of arrayed small convex lenses. FIG. 20A is a plan of the microlens array, showing an array of microlenses 32 arrayed in a specific direction. The microlenses 32 are densely arrayed at equal intervals in the direction of θ in FIG. 20A and sparsely at equal intervals in the direction at a right angle to θ. This state is shown in FIG. 20B and FIG. 20C.

Each individual microlens focuses in both the θ direction and the direction at a right angle to θ. However, since the lenses are densely arrayed in the θ direction, there is no focusing action in the θ direction in a macroscopic view. On the other hand, since microlenses are sparsely arrayed in the direction at a right angle to θ, lights are focused on the microlenses in a macroscopic view to manifest a phenomenon that no lights are condensed between microlenses. Thus, the lens array 3 in this case, too, has a light focusing action in one direction but not in the direction at a right angle to that one direction, a similar action to that of the lenticular lenses.

It is also possible for practical purposes to so form such a microlens array at a pitch of 100 µm or less as to make it smaller than the pitch of the scanning lines 51 of the liquid crystal display panels. By arranging such a microlens array in the position shown with respect to Embodiment 1, a similar effect to what is achieved by Embodiment 1 can be obtained.

Embodiment 3

Figure 21:
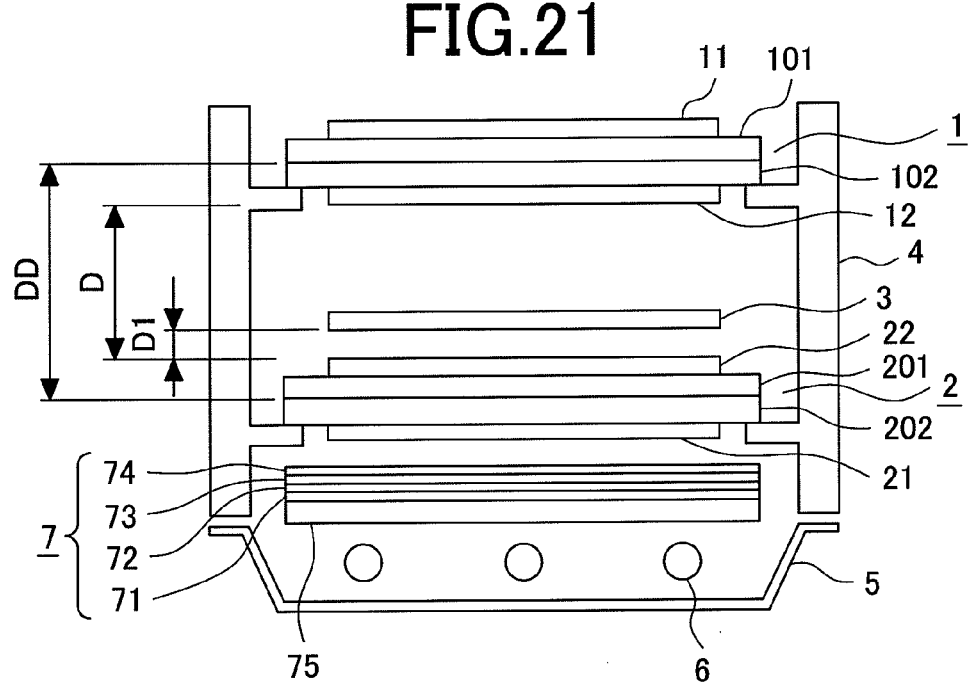
FIG. 21 shows a schematic section of Embodiment 3.
Figure 22:
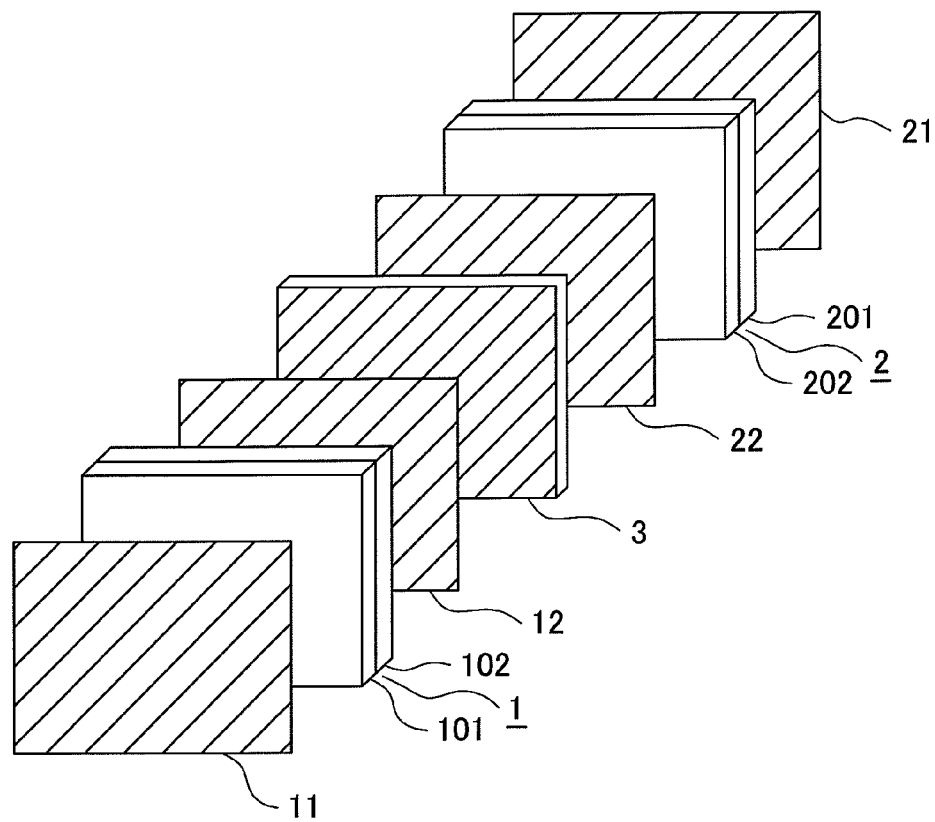
FIG. 22 shows an exploded perspective view of the image formation unit of Embodiment 3.

FIG. 21 is a schematic section showing the configuration of a third embodiment of the present invention. The same members as in Embodiment 1 shown in FIG. 1 are assigned respectively the same reference numerals. The meanings and dimensions of DD, D, D1 and so forth in FIG. 21 are the same as in FIG. 1. FIG. 22 shows the arrangement of optical members, which constitute the essential part of this Embodiment 3. Embodiment 3 differs from Embodiment 1 in that each of the upper liquid crystal display panel 1 and the lower liquid crystal display panel 2 has a lower polarizing board and an upper polarizing board. Thus, an upper polarizing board 11 and a lower polarizing board 12 are stuck to the upper liquid crystal display panel 1 and an upper polarizing board 22 and a lower polarizing board 21 are stuck to the lower liquid crystal display panel 2. The polarization direction of the upper polarizing board 22 of the lower liquid crystal display panel 2 and the lower polarizing board 12 of the upper liquid crystal display panel 1 are made identical here to effectively utilize lights from the backlight.

In the configuration of Embodiment 1, lights coming out of the lower liquid crystal display panel 2, for instance, are unaffected by the polarizing action of the upper polarizing board, and passes the upper polarizing board 11 of the upper liquid crystal display panel 1 to form a complete image. Therefore, when cancellation of polarization is applied to the polarized lights having passed the lower liquid crystal display panel 2, the quantity of lights passing the upper liquid crystal display panel 1 decreases with a drop in luminance level.

On the other hand in the configuration of Embodiment 3 shown in FIG. 21, since the upper and lower polarizing boards are stuck to each of the upper and lower liquid crystal display panels, a complete image is formed on each of the upper liquid crystal display panel 1 and the lower liquid crystal display panel 2. A problem with the configuration of Embodiment 3 is that, since it uses two more polarizing boards than in Embodiment 1, the transmissivity of lights from the backlight in the whole display device decreases. Thus, supposing that the optical transmissivity of one polarizing board is 50%, two such boards mean a decrease to 25%.

In the configuration of Embodiment 3, since a complete image is formed by the time lights have passed the lower liquid crystal display panel 2, it can be assumed that, even if an optical member having an action to cancel polarization is arranged between the upper liquid crystal display panel 1 and the lower liquid crystal display panel 2, the decrease in transmissivity due to the cancellation of polarization can be disregarded. However, even in such a configuration, eliminating moiré, image blurring and the like by using the lens array 3 having a light focusing action provides a greater advantage over eliminating moiré, image blurring and the like by the use of diffusion sheets.

Thus, since diffusion sheets diffuse lights, they intrinsically bring down the front luminance level and float up the black level. Unlike them, the use of a lens array 3 which focuses lights in one direction such as the lenticular lens array 3 enables drops in the luminance levels and contrast to be substantially restrained by controlling the direction of focusing.

Therefore, also in the configuration of Embodiment 3, if a lens array 3 which powerfully focuses lights in a specific direction but does not focus them in a direction at a right angle to that specific direction is used between the lower liquid crystal display panel 2 and the upper liquid crystal display panel 1, moiré and image blurring can be suppressed and drops in the front luminance level and contrast can be restrained. The benefit of the invention can also be achieved with a lens array 3 which powerfully focuses lights in a specific direction but only feebly focuses lights in a direction at a right angle to that specific direction.

In the embodiments so far described, the backlight is a so-called immediately underneath type, in which the light source is immediately underneath the liquid crystal display panels. However, the invention is applicable not only to immediately underneath type backlights, but only to sideway type backlights whose light source is located beside. A sideway type backlight would require an optical guide board which guides lights toward the main faces of liquid crystal display panels from beside in addition to the optical sheet group 7 shown in FIG. 1.

What is claimed is:

1. A display device which comprises a first liquid crystal display panel that displays images, a second liquid crystal display panel that displays images related to the images displayed on the first liquid crystal display panel disposed behind the first liquid crystal display panel with prescribed spacing in-between, each one of the first liquid crystal display panel and the second liquid crystal display panel including a scanning line and a video signal line, wherein images of the first liquid crystal display panel and images of the second liquid crystal display panel have the same polarization, and a backlight disposed behind the second liquid crystal display panel to enable the viewer to recognize an image from in front of the first liquid crystal display panel, wherein a lens array arranged in a specific direction with respect to directions of the scanning lines of the first and second liquid crystal display panels is disposed between the first liquid crystal display panel and the second liquid crystal display panel wherein the specific direction being the extending direction of the longitudinal axis of the lens, wherein the lens array is configured to more powerfully focus light in a direction at a substantially right angle to the specific direction, wherein a first polarizing board is provided on an outer surface of the first liquid crystal display panel facing away from the second liquid crystal display, a second polarizing board is provided on an outer surface of the second liquid crystal display panel facing away from the first liquid crystal display, and no polarizing board is disposed between inner surfaces of the first liquid crystal display panel and the second liquid crystal display panel which inner surfaces face each other, wherein, when viewing the lens array two-dimensionally from in front of the outer surface of the first liquid crystal display panel, the specific direction of the lens array has a diagonal angle greater than 0 degree to a direction to which a scanning line extends, and is substantially identical with the polarizing axis of the first polarizing board or of the second polarizing board, wherein the specific direction in which the lens array is arranged is chosen to reduce moiré visible to a viewer.

2. The display device according to claim 1, wherein the lens array does not focus light in the specific direction.

3. The display device according to claim 1, wherein the angle is approximately 45 degrees.

4. The display device according to claim 1, wherein the lens pitch of the lens array in the direction at a right angle to the specific direction is lower than the scanning line pitch of the first liquid crystal display panel or the second liquid crystal display panel.

5. The display device according to claim 1, wherein the lens array is disposed tangentially to the second liquid crystal display panel.

6. The display device according to claim 1, wherein the lens array comprises lenticular lenses.

7. The display device according to claim 6, wherein flat parts intervene between the lenticular lenses.

8. The display device according to claim 1, wherein a lens section of the lens array is in a wave shape.

9. The display device according to claim 1,
wherein a lens section of the lens array is triangular.

10. The display device according to claim 1,
wherein a lens section of the lens array is triangular and the vertex angle of the triangle is greater than 90 degrees.

11. The display device according to claim 1,
wherein a lens section of the lens array is trapezoidal.

12. The display device according to claim 1,
wherein a lens section of the lens array is a pentagon whose vertex constitutes the tip of a lens.

13. The display device according to claim 12,
wherein the angular parts of the pentagon are substantially tangential to a circle having a prescribed radius.

14. The display device according to claim 1,
wherein the lens array is a microlens array comprising a large number of arrayed small convex lenses, and the pitch of the small convex lenses in the specific direction is lower than at a rectangle to the specific direction.

15. The display device according to claim 1,
wherein the backlight includes a diffusion sheet and a prism sheet which powerfully focuses the backlight in a prescribed direction.

16. The display device according to claim 1,
wherein the backlight includes a diffusion sheet, a prism sheet which powerfully focuses the backlight in a prescribed direction, and another prism sheet which powerfully focuses the backlight in a direction at a rectangle to the prescribed direction.

17. The display device according to claim 1, wherein the first liquid crystal display panel, the second liquid crystal display panel and the lens array are positioned relative to one another and configured to provide a simulated three dimensional image to a viewer of the image displayed on the first liquid crystal display panel.

* * * * *